Patented Jan. 8, 1924.

1,480,016

UNITED STATES PATENT OFFICE.

MAX Y. SEATON, OF MIDLAND, MICHIGAN, ASSIGNOR TO THE DOW CHEMICAL COMPANY, OF MIDLAND, MICHIGAN, A CORPORATION OF MICHIGAN.

CELLULOSE SOLVENT AND RESULTING CELLULOSIC COMPOSITION.

No Drawing. Application filed January 31, 1920. Serial No. 355,398.

*To all whom it may concern:*

Be it known that I, MAX Y. SEATON, a citizen of the United States, and a resident of Midland, county of Midland, and State of Michigan, have invented a new and useful Improvement in Cellulose Solvents and Resulting Cellulosic Compositions, of which the following is a specification, the principle of the invention being herein explained, and the best mode in which I have contemplated applying that principle, so as to distinguish it from other inventions.

The present improved solvent is designed more especially for use in making lacquers having a cellulose ester, particularly cellulose acetate or acetyl cellulose as the base. I have found that propylene chlorhydrin ($CH_3.CH.OH.CH_2Cl$) is an excellent solvent for such cellulose acetate; also that while this compound is not by itself a solvent for cellulose nitrate or nitro-cellulose, its addition to a composition including cellulose nitrate and a solvent or solvents of the latter per se serves to impart desirable qualities to the resulting cellulose composition unattainable by other means, and rendering such composition highly suitable for use as a lacquer. Propylene chlorhydrin boils at 127° C., has a specific gravity of 1.1, and is largely miscible with water. It will be understood that such propylene chlorhydrin need not necessarily be pure, but in fact, as commercially prepared, it will and may contain small quantities of other related derivatives of the higher members of the olefine series of hydrocarbons.

Moreover, as previously indicated, especially where used in preparing a lacquer having cellulose nitrate as the base, I add other solvents as well as non-solvents, such as have found employment in cellulosic compositions intended for use as lacquers. The invention, then, consists of the ingredients hereinafter fully described and particularly pointed out in the claims, the following description setting forth but one of several different combinations of ingredients that may be employed in carrying out the invention.

A typical cellulose acetate lacquer formula, in which propylene chlorhydrin is the main solvent, is as follows, viz 8 parts cellulose acetate, 20 parts propylene chlorhydrin, 20 parts alcohol, and 60 parts benzol. The addition of the alcohol to such lacquer is desirable as giving a lower viscosity and more perfect solution, while the benzol serves primarily as a diluent, or mere vehicle as it would be termed in the case of an ordinary paint or varnish-composition.

A typical formula for a cellulose nitrate lacquer, containing propylene chlorhydrin as the main solvent, is as follows, viz 4 parts cellulose nitrate, 15 parts amyl acetate, 15 parts acetone, 15 parts propylene chlorhydrin, and 55 parts benzol. As already explained, the propylene chlorhydrin will not by itself dissolve cellulose nitrate, it being for this reason that the acetone and acetate, one or both, are used. As in the case of the previous formula, the addition of the alcohol serves to lower the viscosity and give a more perfect solution, while the benzol in the foregoing formula chlor-propyl acetate may be substituted for the amyl acetate if desired acts as a diluent or vehicle. The presence with the propylene chlorhydrin of smaller or larger quantities of the chlorhydrins formed from butylene and higher unsaturated hydrocarbons, is in no sense objectionable, since these act equally to impart desirable qualities to the lacquer, giving a bright clear solution which will dry to a clear, brilliant and elastic film.

It will be understood that my improved cellulosic composition, in either of the several specific forms described above, may be used not merely as a lacquer proper, i. e. as a surface coating for other articles, but, upon drying and proper manipulation, may be formed into a film, or be otherwise shaped for use as an article in itself.

Other modes of applying the principle of my invention may be employed instead of the one explained, change being made as regards the materials employed, provided the ingredients stated by any of the following claims of the equivalent of such stated ingredients be employed.

I therefore particularly point out and distinctly claim as my invention:—

1. A new composition of matter, comprising a cellulose nitrate lacquer and propylene chlorhydrin as an additional ingredient.

2. A new composition of matter, consisting of a solution of cellulose nitrate in a solvent for such nitrate per se having propylene chlorhydrin admixed therewith.

3. A new composition of matter, comprising a solution of cellulose nitrate in an acetate capable of dissolving such nitrate and having propylene chlorhydrin admixed therewith.

4. A new composition of matter, comprising a solution of cellulose nitrate in an acetate capable of dissolving such nitrate and having propylene chlorhydrin and a diluent admixed therewith.

5. A new composition of matter, comprising a solution of cellulose nitrate in amyl acetate having propylene chlorhydrin admixed therewith.

6. A new composition of matter, comprising a solution of cellulose nitrate in amyl acetate and acetone having propylene chlorhydrin admixed therewith.

7. A new composition of matter, consisting of a solution of cellulose nitrate in amyl acetate and acetone having propylene chlorhydrin and benzol admixed therewith.

8. A new composition of matter, consisting of the following ingredients in approximately the proportions stated, viz 4 parts cellulose nitrate, 15 parts of amyl acetate, 15 parts acetone, 15 parts propylene chlorhydrin, and 55 parts benzol.

9. A solvent mixture for cellulose nitrate comprising a solvent of such nitrate per se and propylene chlorhydrin as an additional ingredient.

10. A solvent mixture for cellulose nitrate comprising an acetate capable of dissolving cellulose nitrate and propylene chlorhydrin as an additional ingredient.

11. A solvent mixture for cellulose esters, comprising propylene chlorhydrin in admixture with amyl acetate.

12. A solvent mixture for cellulose esters, comprising propylene chlorhydrin in admixture with amyl acetate and acetone.

13. A solvent mixture for cellulose esters, comprising propylene chlorhydrin in admixture with amyl acetate and acetone together with a suitable diluent.

14. A solvent mixture for cellulose esters, comprising propylene chlorhydrin in admixture with amyl acetate and acetone together with benzol.

Signed by me, this 27th day of January, 1920.

MAX Y. SEATON.